United States Patent [19]

McCabe et al.

[11] 4,219,041

[45] Aug. 26, 1980

[54] ELECTRO-THERMAL FIRE PROTECTION LOCKING CLIP

[76] Inventors: Francis J. McCabe, 239 Hastings Ct., Doylestown, Pa. 18901; John McCabe, 400 Grandview Ave., Feasterville, Pa. 19047

[21] Appl. No.: 896,237

[22] Filed: Apr. 14, 1978

[51] Int. Cl.[3] .......... F16K 17/38

[52] U.S. Cl. .......... 137/79; 16/48.5; 160/1; 251/89; 292/DIG. 66

[58] Field of Search .......... 49/1, 2; 292/DIG. 66; 160/1, 6, 9; 137/67, 75-77, 79, 80, 457, 468; 126/295; 251/89, 298, 303

[56] References Cited

U.S. PATENT DOCUMENTS

| | | | |
|---|---|---|---|
| 2,148,530 | 2/1939 | Burke | 137/79 X |
| 2,538,221 | 1/1951 | Wilber | 251/89 X |
| 3,725,972 | 4/1973 | McCabe | 16/48.5 |
| 3,899,156 | 8/1975 | McCabe | 137/75 X |
| 4,146,048 | 3/1979 | McCabe | 137/75 |
| 4,165,359 | 8/1979 | Thomas et al. | 292/DIG. 66 |

*Primary Examiner*—Alan Cohan
*Assistant Examiner*—Richard Gerard
*Attorney, Agent, or Firm*—Benasutti Associates, Ltd.

[57] ABSTRACT

A novel locking clip is disclosed for use with either fire or smoke dampers, which locking clip normally does not interfere with the operation of those dampers but, which under activation conditions, allows the blades of the damper to move into the desired position, but effectively prevents the blades from moving out of that position until fire conditions have passed.

14 Claims, 4 Drawing Figures

ELECTRO-THERMAL FIRE PROTECTION LOCKING CLIP

BACKGROUND OF THE INVENTION

The present invention relates generally to the field of fire and smoke dampers, and more particularly to the field of fire and smoke dampers which must be held in a preselected position under fire conditions.

In the past, it has been known to close fire dampers and/or to open smoke dampers under fire conditions either in response to heat or, alternatively, in response to a signal received from a remote source.

Heretofore, such fire and/or smoke dampers have generally been held in place by springs, or other operating means which exert influences on the dampers throughout their normal operating ranges, but which, as in the case of springs attached to the blades, are allowed to overcome whatever means normally counteracts those forces but which, under fire conditions are released. For example, in a folding blade fire damper, the damper blades may be held in the open position by a cable attached to a fusible link. Either gravity, springs or some other means may be employed to tend to force those blades towards the closed position. Upon fire conditions, when the fuseable link melts, the forces resisting closure of the blades are eliminated and the blades are forced into the closed position.

While the above-described arrangement for causing the closure (or alternatively, the opening) of dampers is suitable for many purposes, in the event that the damper is also to be used as a volume control damper, such arrangements suffer from the disadvantage that the damper operating mechanism must routinely overcome either opening or closing forces during the routine operation of the damper, when in fact the forces applied to the damper blades may only be needed to maintain the blades in one of those positions under fire conditions.

SUMMARY OF THE INVENTION

The present invention provides a novel, heat responsive locking clip which normally does not interfere with the rotation of the blades of a fire, smoke, or air control damper, but which, either in response to increased temperatures or in response to a remote signal, allows those blades to move to the desired activated position, but prevents those blades from moving out of that position until normal operating temperatures and/or signals are re-established for the particular damper. In order to accomplish these ends, the preferred embodiment locking clip comprises heat responsive means for responding at least to preselected increases in the ambient temperature in the vicinity of its associated damper, restraining means movable by said heat responsive means between standby and activated positions for permitting the unfettered operation of its associated damper when said restraining means is in the standby position and for preventing movement of at least one of the blades of said damper out of a preselected blade activated position when said restraining means is in its activated position. In the preferred embodiment, said heat responsive means biases said restraining means into said activated position in response to at least said preselected increase in ambient temperature, and said restraining means further comprises guide means for slideably engaging at least a portion of said blade to be restrained when said restraining means is in said activated position and as said blade is moved into its blade-activated position. In alternate embodiments of the present invention, the preferred heat responsive means may either by bimetallic elements or thermally responsive cylinders, either of which means may be electrically activated from a remote source. In one alternate embodiment of the present invention a bimetallic means is configured to further comprise a restraining means. In other embodiments of the present invention, the restraining means is pivotally connected with respect to a portion of the damper frame.

Accordingly, a primary object of the present invention is the provision of a reliable, simple, and inexpensive means for locking at least one of the blades of a smoke, fire, or air control damper into its preselected fire activated position.

Another aim of the present invention is the provision of a locking means which is activated by a heat responsive means which is a bimetallic element.

A further aim of the present invention is the provision of a locking clip for a smoke, fire, or air control damper wherein a heat responsive means is provided which is a thermally responsive cylinder.

A further object of the present invention is the provision of a damper restraining means which allows the damper to operate in an unfettered manner under normal operating conditions.

These and other objects of the present invention will become apparent from the following more detailed description.

DETAILED DESCRIPTION OF THE PREFERRED EMBODIMENT

Figure 1:
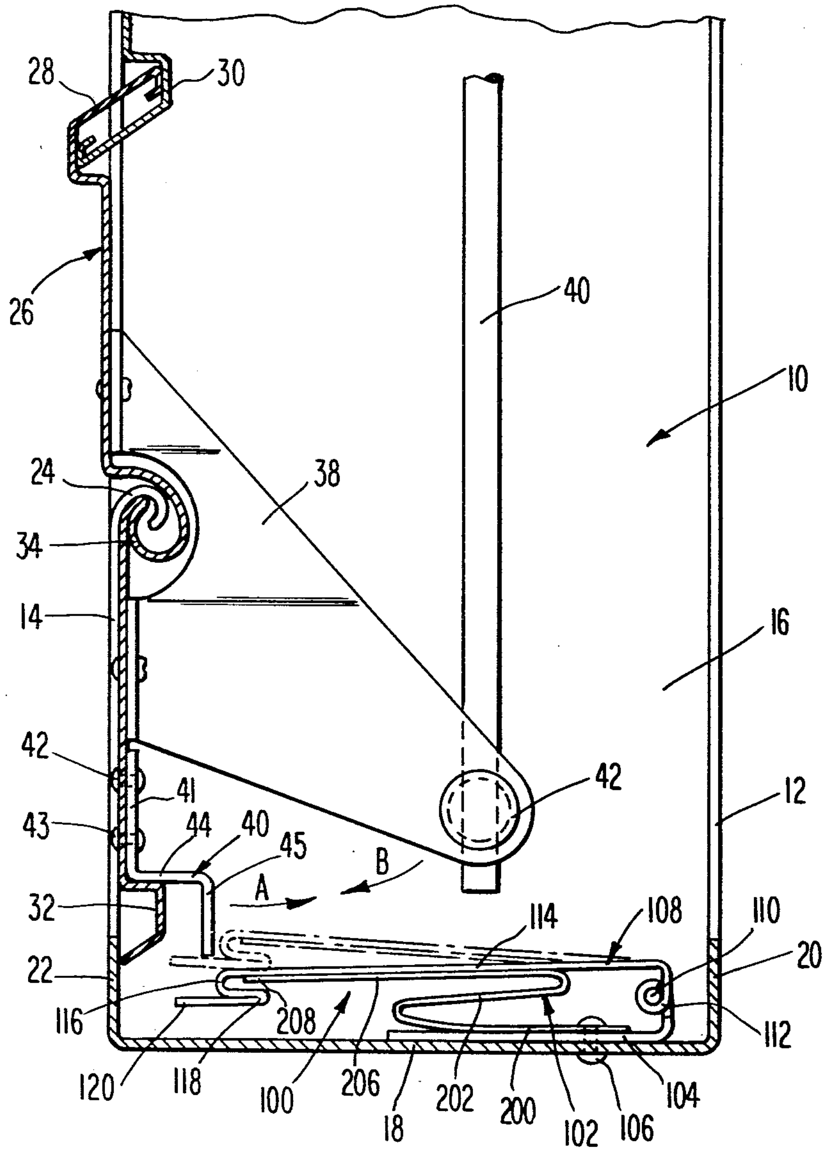
FIG. 1 is a cross-sectional, fragmentary side view of a smoke, fire, or air control damper similar to that illustrated in U.S. patent application Ser. No. 729,831, filed Oct. 4, 1976, now U.S. Pat. No. 4,113,232, entitled, "Smoke, Fire, and Air Control Damper With Stamped Blade Hinge;" which application is hereby incorporated by reference.

Although specific forms of the invention have been selected for illustration in the drawings, and the following description is drawn in specific terms for the purpose of describing these forms of the invention, this description is not intended to limit the scope of the invention which is defined in the appended claims.

Referring now to the drawings, and particularly FIG. 1 thereof, a cross-sectional, fragmentary side view of a portion of a smoke, fire, or air control damper is illustrated. The damper is seen to comprise a frame designated generally 10 having a side wall 16 which terminates along its longitudinal edges in inwardly depending flanges 12 and 14. The frame designated generally 10 also comprises a bottom 18 which is joined at its longitudinal edges to upstanding flanges 20 and 22, which are shown in cross-section in FIG. 1. Inwardly depending flange 14 is notched periodically to form hook-shaped hinge portions, one of which, hinge portion 24 is illustrated in FIG. 1. One full blade, designated generally 26 is illustrated in FIG. 1 in its closed position. The hook-shaped tip portion 28 of which is shown sealed with respect to the hook-shaped portion 30 of its adjacent blade. As seen in FIG. 1, the lower terminal portion 32 of blade 26 has a truncated, hook-shaped portion which is adapted to create a seal with respect to upstanding flange 22. The blade 26 also has defined thereon a hook-shaped hinge portion 34 which is complementally conformed with respect to the hook-shaped hinge element 24 of the inwardly depending flange 14 such that the blade 26 will freely pivot therearound. Blade 26 is articulated with respect to the remaining blades in the damper by means of blade bracket 38 which is pivotally attached to operator rod 40 by pivot 42. Similar brackets are attached to adjacent blades, such that, upon axial movement of rod 40, the remaining blades in the damper will assume the same position as blade 26. A first preferred embodiment locking clip designated generally 100 in FIG. 1 comprises a serpentine bimetallic element 102, a base plate 104 which is riveted by rivet 106 to frame bottom 18, and a restraining member 108 which is pivotally attached to base 104 in a standard hinging arrangement around hinge pin 110. Restraining member 108 is defined into pivoting portion 112, which is complementally conformed with respect to the exterior surfaces of hinge pin 110, and intermediate portion 114 for engaging a portion of the serpentine bimetallic element 102, a restraining portion 116, an overlapping portion 118 and a terminal or stop portion 120.

The serpentine bimetallic element designated generally 102 in FIG. 1 is similar to that described in U.S. Pat. No. 3,889,314, dated June 17, 1975 which is also hereby incorporated by reference. The bimetallic elements 102 illustrated in FIGS. 1, 2 and 4 hereof are similar to that shown in FIGS. 1 and 2 of this patent. It is within the scope of the present invention to configure such elements to be similar to the elements shown in either FIGS. 3 or 4 of this patent. By the same token, although a serpentine bimetallic element is preferred, it is within the scope of the present invention to substitute a bimetallic element which has a similar configuration to the bimetallic element illustrated in U.S. Pat. No. 3,725,972, which patent is also hereby incorporated by reference.

As shown in FIG. 1, the bimetallic element 102 has a base portion 200, an overlapping mid-portion 202, an end portion 206 and a tip 208, which portions respond in the presence of heat in manners similar to that described in connection with the aforementioned U.S. Pat. No. 3,889,314.

In FIG. 1, the heat responsive locking clip 100 is in its normal position as shown in the solid lined drawing. The tip portion 208 of the bimetallic element 102 is seen to be confined within a slot formed between overlapping portion 118 and that portion of the mid-portion 114 of restraining member 108 which it overlaps. Accordingly, return of the bimetallic element to its normal position, which it assumes in response to a normal room temperature, draws the restraining member 108 into approximately the solid line position shown in FIG. 1. The end portion 206 of element 102 will be seen to lie against and engage the mid-portion 114 of restraining member 108. Upon a preselected increase in the temperature surrounding the bimetallic element 102, or in alternate embodiments in response to the heating of that element, as for example electrically, the bimetallic element will assume the position shown in phantom in FIG. 1. Accordingly, the restraining member 108 will also move into the position shown in phantom in FIG. 1 until the terminal or stop portion 120 of that restraining member engages the end of blade restraining bracket 40. The blade restraining bracket designated generally 40 is defined into a base portion 41 which lies against a portion of the blade face and is attached thereto by rivets 42 and 43, an extension portion 44 extending generally away from the plane of the blade, and a terminal portion 45 which is parallel to the plane of the blade but substantially offset from the plane of that blade. Clearance for the hook-shaped end portion 32 is thus created by offsetting the terminal portion 45 from the face of the blade. Upon activation of the locking clip in response to elevated temperatures, the stop portion 120 engages the end of tip portion 45 of the blade restraining bracket 40 to prevent further pivoting of the blade restraining member 108 around hinge pin 110. In the position shown in phantom in FIG. 1, the damper blade designated generally 26 will be prevented from opening or pivoting in the direction as illustrated by arrow A in FIG. 1. This results from an interference between tip portion 45 of blade restraining bracket 40 and interfering portion 116 of the blade restraining member 108, which, although somewhat curved in the preferred embodiment essentially presents a restraining surface which is parallel to the plane of the blade as well as to the plane of the surface of the tip portion 45 of blade restraining bracket 40. Accordingly, when the bimetallic element is activated in response to heat, blade 26, if in the closed position, will be prevented from opening. Alternatively, in the event blade 26 is in the open position upon activation of the bimetallic element, and thus the locking clip, the blade will nonetheless readily assume the closed position, since the bimetallic element 102 serves to bias the blade restraining member 108 away from the bottom 18 of the frame but not with such force that upon movement of the blade in the direction of arrow B shown in FIG. 1, that the end of the tip portion 45 of blade restraining bracket, or alternatively, the tip of hook-shaped end portion 32 of the blade will not be able to slideably engage the top surface of the intermediate portion 114 of restraining member 108 and force that restraining member and the bimetallic element towards the position shown in solid lines in FIG. 1 until the blade restraining bracket 40 has assumed the position shown in FIG. 1, whereupon the bimetallic element 102 and blade restraining member 108 will snap back into the phantom line (activated) position to again lock the blade into the closed position.

Figure 2:
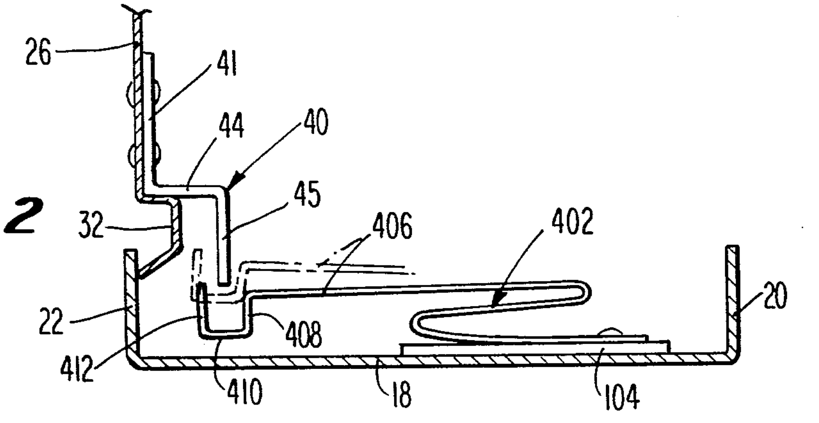
FIG. 2 is a fragmentary view similar to that shown in FIG. 1 of a portion of similar smoke, fire, or air control damper incorporating an alternate embodiment locking clip in accordance with the present invention.

Referring now to FIG. 2, an alternate embodiment locking clip is illustrated wherein the bimetallic element designated generally 402 has, extending perpendicular away from its tip 406, a blade restraining portion 408, a bimetal stop portion 410 and an upstanding flange 412 extending away therefrom to form a generally hook-shaped terminal portion which, upon activation, will receive the tip 45 of blade restraining bracket 40. In the configuration illustrated in FIG. 2, the additional upstanding flange portion 412 is provided at the terminus of the bimetallic element to prevent the end of blade engaging bracket 40 from slipping off stop portion 410, particularly during conditions of extreme heat when some deformation of all of the components of the damper may be expected.

Figure 3:
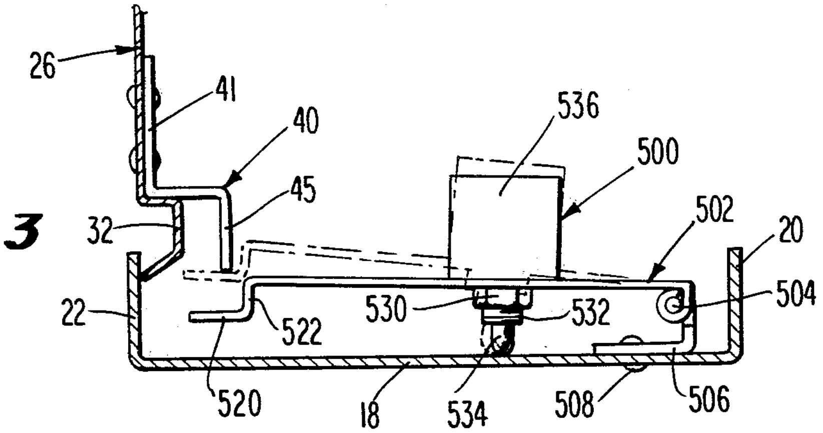
FIG. 3 is a fragmentary side view similar to that shown in FIG. 1 illustrating a second alternate embodiment locking clip in accordance with the present invention.

Referring now to FIG. 3, another alternate embodiment of the present invention is illustrated wherein a thermally responsive cylinder is provided as a substitute for the bimetallic element illustrated in FIGS. 1 and 2. The thermal cylinder designated generally 500 is mounted through a blade restraining member 502 which is hinged through pivot pin 504 to a base 506 which is riveted by rivet 508 to the bottom 18 of the frame. As in the embodiments of figures in FIGS. 1 and 4, the blade restraining member, pivot pin, and base may be simply constructed, if desired, by modifying a conventional steel strap hinge. As with the embodiment shown in FIG. 1, the tip of the blade restraining memeber 502 is defined into a stop portion 120, which is generally perpendicular to the plane of the blade and a blade restraining portion 522 which is generally parallel to the plane of the blade, as well as to the plane of the tip portion 45 of blade restraining bracket 40 when the blade is in the closed position. In this embodiment, a thermally responsive cylinder 500 is provided which is bolted by nut 530 engaged around sleeve 532 through an aperture defined in restraining member 502. Piston rod 534, in its normal position, does not extend beyond the position shown in solid lines in FIG. 3, and the weight of the cylinder body 536 and the fluid contained therein causing the restraining member 502 to lie in the solid line position shown in FIG. 3. Upon an increase in ambient temperature, however, an increase in pressure will be developed within the cylinder, as for example as a result of liquid within the cylinder becoming a gas, thereby causing the cylinder rod or plunger 534 to extend and the blade restraining member and cylinder to pivot into the phantom lined position shown in FIG. 3 to thereby lock the blade 26 in the closed position. The cylinder may preferably be remoted activated, as for example, through electrical heating of the fluid within the cylinder.

Figure 4:
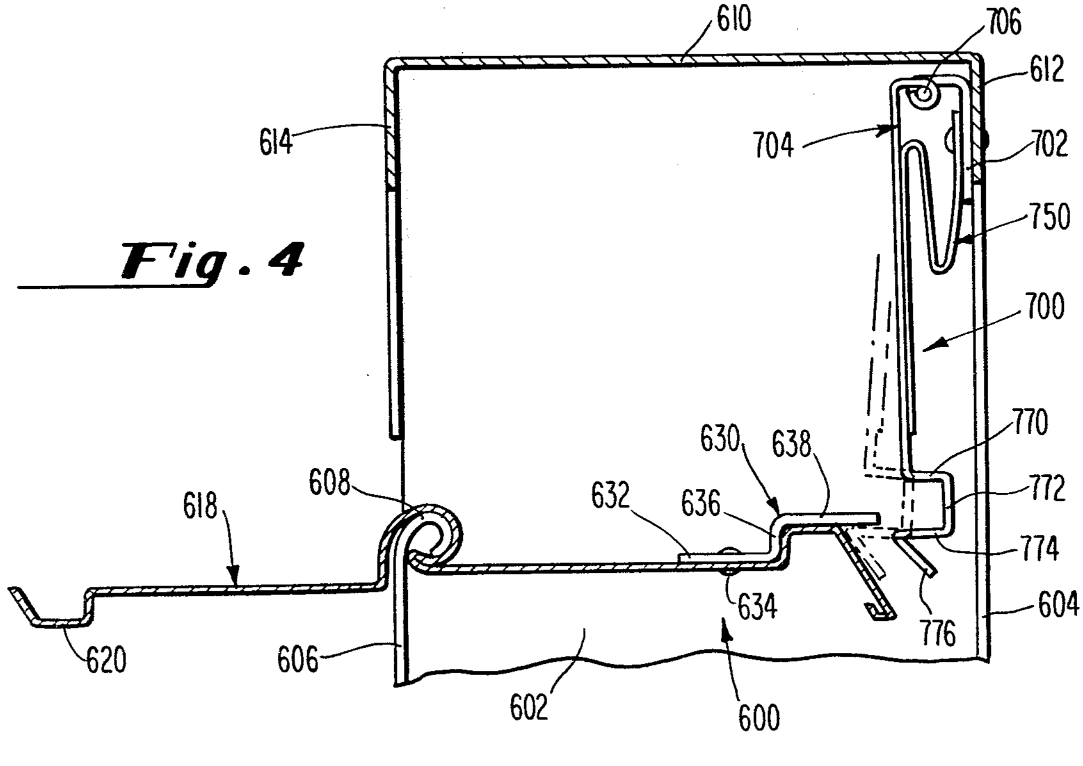
FIG. 4 is a cross-sectional, fragmentary side view of a smoke damper similar to that illustrated in U.S. patent application Ser. No. 729,831, filed Oct. 4, 1976 entitled, "Smoke, Fire, and Air Control Damper With Stamped Blade Hinge" wherein a third alternate embodiment locking clip is illustrated for maintaining at least one blade of that damper in the open position.

Referring now to the embodiment illustrated in FIG. 4, an alternate embodiment makes it possible to lock the blades of a smoke damper in an open position. The damper construction illustrated in FIG. 4 is similar to that illustrated in FIG. 1. The damper portion designated generally 600 has a side wall 602 which spans between inwardly depending flanges 604 and 606. Inwardly depending flange 606 has a plurality of hook-shaped hinge elements formed therein, one of which, hinge element 608 is shown in FIG. 4. Damper frame 600 has a top 610 which spans between downwardly depending flanges 612 and 614. One blade, designated generally 618 is shown pivotally mounted on hinge element 608 for rotation therearound, and is seen to have a truncated hook-shaped end portion 620 which, in the closed position will create a seal with respect to downwardly depending flange 614. The other end of blade 618 is defined into a hook-shaped end portion 622 which, in the closed position, will preferably form a seal with respect to a complementally formed hook-shaped end portion of an adjacent blade. A blade restraining bracket, designated generally 630 is mounted on blade 618. This blade restraining bracket comprises a base 632 which is riveted by rivet 634 to one surface of the face of the blade, the remainder of said bracket comprising a transverse extension portion 636 and a parallel tip 638 which, in the locked position, engages a portion of the locking clip, as described more fully hereinafter. The locking clip designated generally 700 comprises a base portion 702 which is riveted to downwardly depending flange 612. A blade restraining member 704 is spaced apart from and hinged with respect to base 702 by means of hinge pin 706. Disposed between the blade restraining members 704 and base 702 is a bimetallic element, designated generally 750 which is similarly configured to the bimetallic element designated generally 102 as described in FIG. 1. In this embodiment, however, the blade restraining member 704 has a tip which is differentiated into an offsetting portion 770, an extension portion 772, a transverse blade restraining portion 774, and a guide portion 776 which are configured as shown in FIG. 4. Together, the offsetting portion 770, extension portion 772, and transverse blade restraining portion 774 define a wide channel which is adapted to receive at least a portion of the tip 638 of blade restraining bracket 630. In this embodiment, when the blade is locked in the open position, over-pivoting of blade restraining member 704 is prevented by interference between the guide member and a complementally configured surface on hook-shaped end portion 622 of blade 618. The slope of the guide portion 776 with respect to the arc of travel of the tip 638 of the blade restraining brackets 630 upon movement of the blade into the open position as shown in FIG. 4 is such that the end of tip portion 638 will slidingly engage the surface of guide portion 776 to temporarily displace the blade restraining member 704 and bimetallic element 750 away from the activated (phantom) position towards the normal (solid line) position shown in FIG. 4 until the blade restraining portion 774 and guide portion 776 can snap into the position shown in phantom in FIG. 4 to maintain the blade 618 in the open position. As with the previous embodiments, it should be noted that the tip 638 and blade restraining portion 774 are oriented in planes which are offset but generally parallel to the plane of the blade 618.

As seen from the above description, the present invention provides a simple, efficient, and reliable locking clip which is heat activatable, or which, alternatively, may be activated electrically from a remote source. Even if the ambient temperatures have increased to a point where the locking clip has moved to its activated position, the blade(s) to be locked may, nonetheless, move into its locked position. This is accomplished by biasing of the blade restraining member of the locking clip generally towards the locked position while providing a guide surface over which the blade restraining bracket attached to the blade may slide until the blade reaches the locked position. Upon return of ambient temperatures, the blade restraining member, or alternatively, for the embodiment shown in FIG. 2, the bimetallic element itself, will return to a position wherein the damper operable in a conventional matter, unfettered by interference from the locking clip.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. An improved heat responsive locking device for use with fire, smoke, or air control dampers having a frame and at least one blade pivotally mounted with respect to said frame, comprising:

locking clip means mounted on said frame for movement at least in response to a preselected increase in ambient temperature between normal and activated positions, said locking clip means allowing said blade to freely pivot with respect to said frame when said means is in its normal position, and preventing said blade from moving out of a preselected locked position with respect to said frame when said means is in its activated position, and further where, in response to said preselected increase in ambient temperature, said locking clip means being biased into said activated position.

2. The invention of claim 1 wherein said locking clip means in its activated position is configured to slidingly engage at least a portion of said blade as said blade is moved into said locked position, said movement of said blade towards said locked position overcoming said biasing to temporarily displace said means towards said normal position.

3. The invention of claim 2 wherein said displacement of said locking clip means continues until said blade has moved into said locked position, whereupon said locking clip means returns to its activated position.

4. The invention of claim 2 wherein said locking clip means comprises a bimetallic element.

5. The invention of claim 4 wherein said bimetallic element is a serpentine bimetallic element.

6. The invention of claim 4 wherein said bimetallic element further comprises blade restraining means disposed substantially parallel to the plane of said blade when said blade is in the locked position for interfering with the movement of said blade out of the locked position when said heat responsive means is in the activated position.

7. The invention of claim 6 wherein said bimetallic element further comprises stop means for interfering with at least a portion of said blade when said blade is in the locked position and said locking clip means is in the activated position and for preventing said locking clip means from moving to a position beyond said activated position relative to said normal position.

8. The invention of claim 7 wherein said heat responsive means further comprises a means for maintaining the engagement of said stop means in the presence of extreme heat when said blade is in the locked position and said heat responsive means is in the activated position.

9. The invention of claim 2 wherein said locking clip means further comprises a blade restraining means pivotally mounted with respect to said frame for interfering with the movement of said blade out of said preselected locked position with respect to said frame when said locking clip means is in its activated position.

10. The invention of claim 9 wherein said locking clip means further comprises a heat responsive means mounted in engagement with said blade restraining means for causing said blade restraining means to pivot with respect to said frame in response to said preselected increase in ambient temperature.

11. The invention of claim 10 wherein said heat responsive means further causes said blade restraining means to return from its activated to its normal position in response to normal temperature conditions.

12. The invention of claim 10 wherein said blade restraining means further comprises a base mounted on said frame and a blade restraining member pivotally attached to said base, said blade restraining member having at least one blade restraining surface defined thereon for interfering with the movement of said blade out of said locked position when said locking clip means is in its activated position.

13. The invention of claim 9 wherein said blade restraining means further comprises a stop means for interfering with at least a portion of said blade when said blade is in the locked position and said locking clip means is in the activated position and for preventing said locking clip means from moving to a position beyond said activated position relative to said normal position.

14. The invention of claim 2 wherein said locking clip means comprises a blade restraining means for interfering with the movement of said blade out of its preselected locked position when said locking clip means is in its activated position, and wherein said locking clip means further comprises a cylinder means mounted on said blade restraining means for responding to at least said preselected increase in ambient temperature, and for causing the movement of said blade restraining means to cause said interference between said blade restraining means and said blade.

* * * * *